United States Patent Office

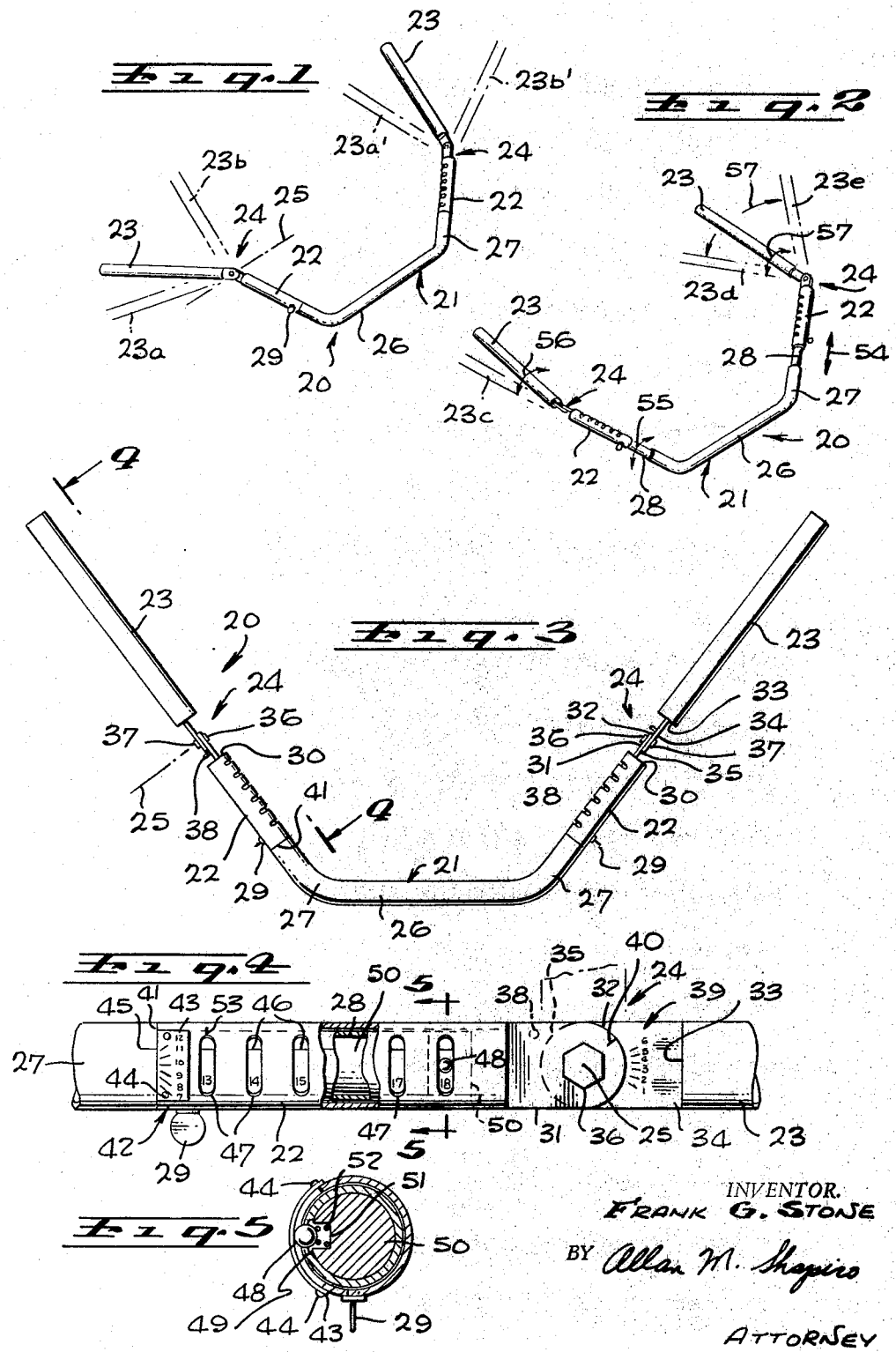

3,505,901
Patented Apr. 14, 1970

3,505,901
APPARATUS FOR CUSTOM HANDLEBAR SELECTION
Frank G. Stone, Long Beach, Calif., assignor of one-half to Peter Mead, Canoga Park, Calif.
Filed June 21, 1968, Ser. No. 749,553
Int. Cl. B62k *21/16*
U.S. Cl. 74—551.4
8 Claims

ABSTRACT OF THE DISCLOSURE

Apparatus for individual pre-manufacture selection of motorcycle handlebars and the like. The apparatus comprises a generally U-shaped central member, the end portions of which are inserted into substantially cylindrical extension members. The extension members are attached to handles by articulating joints which permit selection of the angle of attachment. Translation and rotation of the cylindrical members with respect to the end portion permit selection respectively of handlebar length and handle orientation. Appropriate scales are provided for recording the selected configuration, the scales facilitating ready fabrication of the desired custom handlebar.

BACKGROUND OF THE INVENTION

(1) Field of the invention

The present invention relates to a handlebar selection apparatus and, more particularly, to an apparatus for the individual pre-manufacture selection of motorcycle handlebars and the like.

(2) Description of the prior art

With the ever increasing variety of motorcycles, scooters and similar vehicles available in today's market, experience has shown that handlebar configuration is a significant factor effecting selection of a motorcycle. Thus, when a customer looks over the stock of available motorcycles, he typically will sit on the motorcycle seat and put his hands on the handlebar grips to get the feel of the machine. If the handlebars are too long, too short or at the wrong angle, the customer may find the vehicle uncomfortable. It will be appreciated that driver comfort is extremely important since it affects his balance, driving skill and general safety.

With the great variety of motorcycle sizes and configurations, which obviously do not take into account the variations in length of the human torso and arms, width of shoulders, and so forth, the motorcycle dealer in the past has been forced to stock a wide variety of handlebar configurations in the hope of having available one which suits the needs and desires of each buyer. Conversely, the purchaser often has had to satisfy himself with a motorcycle having a handlebar not completely to his liking, having been forced to accept this for the lack of an available handlebar more appropriately fitting his needs.

While custom designed handlebars are not unknown, in the past their implementation has been economically infeasible, partly for lacking of a convenient apparatus on which the customer might indicate his desired handlebar shape. The present invention provides such an apparatus, which may be utilized by the motorcycle purchaser for custom selection of a handlebar configuration and simultaneously provides the remote manufacturer with the needed information for fabrication of the custom configuration.

SUMMARY OF THE INVENTION

In accordance with the present invention, there is provided an apparatus for individual pre-manufacture selection of motorcycle handlebars and the like. The apparatus typically would be used by a motorcycle sales facility to permit customer selection of desired handlebar configuration. Subsequently, a corresponding handlebar would be custom manufactured for incorporation in the delivered motorcycle.

The inventive apparatus is generally handlebar-shaped, comprising a unitary, U-shaped central member having a straight center portion angularly attached by intermediate portions to end portions of smaller diameter. The end portions are telescopically inserted respectively into a pair of cylindrical extension members, each adapted for telescopic longitudinal and/or rotational motion with respect to the central portion. A pair of substantially straight handles, corresponding to the portions of a handlebar which normally would receive rubber or plastic grips are pivotally connected to respective ones of the extension members.

With this construction, the handles may be pivotally oriented about the articulating joint, and the extension members may be slidably moved longitudinally or rotationally of the central member. This combined motion permits selection of both overall handlebar length and the complete angular orientation of the handles.

Appropriate scales are provided to indicate the selected handlebar configuration. The scale indications may be related to corresponding marks on a jig subsequently used by a manufacturer to bend a tube into a custom handlebar of the desired shape.

Thus, it is an object of the present invention to provide an apparatus for individual pre-manufactured selection of motorcycle handlebars and the like.

It is another object of the present invention to provide a handlebar selection apparatus having adjustably orientable components.

Another object of the present invention is to provide a handlebar selection apparatus comprising a generally U-shaped central portion and a pair of tubular grip portions or handles connected thereto by means of articulating joints.

Yet another object of the present invention is to provide a custom selection apparatus for a handlebar, the apparatus comprising a generally U-shaped central member and handlebar portions angularly and longitudinally adjustable with respect to the central member.

It is yet another object of the present invention to provide apparatus for pre-manufacture selection of motorcycle handlebars comprising a tubular central section telescopically mating with cylindrical extension members adapted for rotational and longitudinal motion with respect thereto.

A further object of the present invention is to provide a handlebar pre-selection apparatus providing independent angular and longitudinal orientation of the various portions thereof.

Yet a further object of the present invention is to provide an apparatus for pre-manufacture selection of handlebars, the apparatus including scales indicating the selected angular orientations.

Still a further object of the present invention is to provide an apparatus for individual pre-manufacture selection of motorcycle handlebars comprising a substantially U-shaped cylindrical central member, a pair of cylindrical extension members, ends of said central section being telescopically inserted thereinto in a manner to permit relative rotational and longitudinal or axial motion therebetween, the cylindrical portions being pivotally connected to handles by means of articulating joints.

Still other objects, features and attendant advantages of the present invention, together with various modifications, will become apparent to those skilled in the art from a reading of the following detailed description of the preferred embodiment constructed in accordance therewith, taken in conjunction with the accompanying illustrative drawings wherein like numerals designate like parts in the several figures.

BRIEF DESCRIPTION OF THE DRAWINGS

FIGURES 1 and 2 are perspective views of apparatus in accordance with the present invention for individual pre-manufacture selection of motorcycle handlebars and the like, various articulating positions being indicated in phantom.

FIGURE 3 is a detailed plan view of the inventive handlebar selection apparatus shown in FIGURES 1 and 2.

FIGURE 4 is an enlarged fragmentary plan view of the inventive apparatus, partly broken away and sectional, taken substantially along line 4—4 of FIGURE 3.

FIGURE 5 is a transverse sectional view of the inventive apparatus as seen generally along the line 5—5 of FIGURE 4.

DESCRIPTION OF THE PREFERRED EMBODIMENT

Referring now to the drawings and, more particularly to FIGURES 1, 2 and 3 thereof, there is shown a preferred embodiment of the inventive apparatus for custom pre-manufacture selection of a motorcycle handlebar or the like. As seen therein, inventive apparatus 20 comprises a unitary, generally U-shaped central member 21, which typically may be of tubular metallic construction. The end portions of central member 21 are adapted to telescopically receive a pair of cylindrical extension members 22. A pair of rod-shaped handles 23 are attached to respective extension members 22 by means of a corresponding pair of articulating joints 24. Normally, apparatus 20 will be mounted conventionally on the desired motorcycle selected by the customer.

As will be described in detail hereinbelow, each handle 23 is adapted to pivot with respect to extension member 22 about an axis 25 through joint 24. This articulate motion is illustrated in FIGURE 1, wherein each handle 23 is seen to be angularly selectably positionable to locations 23a, 23a', 23b or 23b' shown in phantom. Moreover, cylindrical extension member 22 may be longitudinally and/or rotationally oriented with respect to central member 21, as indicated generally in FIGURE 2.

Referring in detail to the construction of the inventive handlebar selection apparatus, it may be seen in FIGURES 2, 3, and 4 that central member 21 includes a straight central portion 26 angularly attached to respective ends of which are a pair of intermediate portions 27. Typically, central portion 26 corresponds to that handlebar section which normally would be attached to a motorcycle or similar vehicle. As best illustrated in FIGURE 2, fixedly attached to intermediate portions 27 are a pair of tubular end portions 28 each having a reduced diameter. End portions 28 may be integral with central member 21, or may comprise separate tubes, ends of which are inserted into respective intermediate portions 27 and fixedly attached thereto by welding or the like. Alternatively, intermediate portions 27 may themselves function as the end portions, the inner diameter of cylindrical extension members 22 being selected to allow telescopic insertion therein of intermediate portions 27.

Cylindrical extension members 22 each have an inner diameter adapted for slidably telescopic reception of end portions 28, sufficient clearance being provided therebetween to permit smoothly slidably rotational and/or longitudinal or axial translation motion of each extension member 22 with respect to corresponding end portion 28. Preferably, the inside diameter of extension member 22 is less than the outside diameter of intermediate portions 27. As most clearly evident in FIGURE 4, but also shown in FIGURES 1, 2, and 3, each extension member 22 is provided with a thumb screw 29 extending through a threaded hole in member 22. Thumb screw 29 may be tightened against end portion 28 to retain cylindrical extension member 22 at a selected position when desired in use.

Extending from a closed end 30 of each cylindrical extension member 22 is a rigid planar member 31 having a rounded edge 32. Similarly extending from an end 33 of handle 23 is a corresponding rigid planar member 34 having a rounded edge 35. Planar members 31 and 34 are pivotally connected by appropriate means such as a hex-head bolt 36 and a self-locking nut 37. Thus, parallel adjacent planar members 31 and 34, together with bolt 36 and nut 37, comprise pivotally articulating joint 24. It is evident from this construction that each handle 23 may be pivotally oriented with respect to cylindrical extension members 22 about axis 25 which is coaxial with bolt 36. A pin 38 extending perpendicularly from member 31 provides a stop limiting the angular extent to which handle 23 may be pivoted with respect to extension member 22.

As best seen in FIGURE 4, planar member 34 is provided with an engraved scale 39 comprising a set of marks (preferably consecutively numbered 1 through 6 as indicated) extending radially from axis 25. A radial reference mark 40 is provided adjacent semi-circular edge 32 of planar member 31. Scale 39 and reference mark 40 together cooperate to indicate the angular relationship between handle 23 and cylindrical extension member 22. In an alternative embodiment, not shown, scale 39 may be fabricated on a flat piece of plastic or the like, the scale then being attached to planar member 31 either adhesively or by means of rivets or the like.

As also evident in FIGURE 4, cylindrical extension member 22 is provided adjacent open end 41 with a scale 42. As illustrated, scale 42 comprises a plurality of marks equally spaced about the periphery of member 22 adjacent edge 41. The marks are consecutively numbered, the lowest number preferably being higher than the highest reference member on scale 39 so that, as indicated, the numbers may be 7 through 12. In the embodiment shown, scale 42 is engraved on a plastic or like member 43 having a radius of curvature corresponding to the outer diameter of extension member 22, and attached thereto by rivets 44. Alternatively, scale 42 may be engraved directly onto extension member 22. Intermediate portion 27 is provided with a longitudinal reference mark 45, which reference mark is aligned with a reference line 46 extending longitudinally along the outer surface of end portion 28. It will be appreciated that scale 42 and mark 45 cooperate to indicate the rotational relationship between intermediate portion 27 or end portion 28 and cylindrical extension member 22. When extension member 22 is extended along end portion 28, as shown for example in FIGURE 2, scale 42 cooperates with extended reference line 46 to provide a like indication of rotational relationship.

As best shown in FIGURES 4 and 5, each cylindrical extension member 22 is provided with a plurality of elongate openings or slots 47, each extending transverse to the axis of extension member 22. Preferably, slots 47 are equally spaced longitudinally of members 22.

Each of end portions 28 is provided with a solid ball 48, preferably of steel or the like, which is retained within a hole 49 through end portion 28. Hole 49 preferably has a diameter slightly less than the diameter of ball 48. End portion 28, if tubular as shown, is provided with a solid cylindrical insert 50 having a recess 51 therein. A spring 52 seated within recess 51 biases steel ball 48 outwardly of end portion 28.

With thumb screw 29 loosened, cylindrical extension member 22 may be positioned longitudinally of end portion 28. When so positioned to a location at which ball 48 is aligned with one of the slots 47, the pressure provided by bias spring 52 will force ball 48 partially into the slot, thereby resiliently retaining or detaining cylindrical extension member 22 at this selectable location. Of course, when extension member 22 is intentionally moved longitudinally of end portion 28, the force exerted by the edge of slot 47 on ball 48 will depress the ball sufficiently far to permit alignment of extension member 22 with the next of slots 47. It will be appreciated that since slots 47 are of considerable transverse extent, rotation of cylindrical extension member 22 about end portion 28 is possible while still maintaining ball 48 within a selected one of slots 47.

A plurality of reference numerals (herein illustrated as 13 through 18) may be engraved on end portion 28 so as to be evident through slots 47. A corresponding reference mark 53 adjacent one of slots 47 cooperates with these references marks (13-18) to define the longitudinal position of cylindrical extension member 22.

In operation, a customer purchasing a motorcycle would adjust the inventive apparatus to the handlebar configuration which feels most comfortable to him. For example, the customer is able to select the angular relationship between cylindrical extension member 22 and handle 23. Thus, as illustrated in FIGURE 1, one of handles 23 may be angularly adjusted to a selectable position such as 23a, with the other handle adjusted either to the same angle or a different angle such as that illustrated at 23b'.

Moreover, the customer may find that he desires a longer or shorter handlebar. Such selection of length is also possible by loosening thumb screw 29 and moving one or both of cylindrical extension members 22 longitudinal of end portions 28, for example, from the shortest position shown in FIGURES 1 and 3 to a longer extension as illustrated in FIGURE 2. Such longitudinal motion is indicated generally by arrow 54 in FIGURE 2. Cylindrical member 22 will remain at the selected longitudinal extension by the cooperative detent action of spring biased ball 48 and an appropriate one of slots 47.

Having selected the desired handlebar length, the customer may also select the angular relationship between handles 23 and the plane defined by central member 21. This is accomplished by rotating each of cylindrical extension members 22 with respect to end portions 28, as indicated by arrow 55 in FIGURE 2. Of course, this rotation causes a corresponding rotation of handle grip portion 23, as illustrated by arrow 56 and phantom position 23c in FIGURE 2. If desired, the pivotal relationship between handle 23 and extension member 22 may be readjusted in the new planar orientation, as indicated generally by arrows 57 and phantom positions 23d and 23e in FIGURE 2.

Of course, the less sophisticated customer will perform all of the foregoing operations without thought as to the actual coperative relationships which are occurring, merely grasping the handles 23 and manipulating the apparatus automatically to the most comfortable and therefore safe configuration.

When the customer has found the handlebar configuration most comfortable to him, thumb screw 29 is tightened to maintain cylindrical extension member 22 at the selected rotational and longitudinal position. Self-locking nuts 37 provide sufficient tension to ensure that pivotally articulating joints 24 will be maintained at their selected orientation. The salesman then records the selected orientation, as read on scales 39, 42 and 53. In particular, scale 39 and reference mark 40 indicate the selected desired pivotal relationship between cylindrical extension member 22 and handle 23. Scale 42 and reference lines 45 or 46 indicate the rotational orientation of cylindrical extension member 22 with respect to end portion 28, and hence indicate the desired plane at which handles are attached to central member 21. Finally, the extension reference number (one of 13-18) opposite mark 53 is recorded to indicate the desired length of the handlebar. Of course, it will be appreciated that the configuration of the right side of the handlebar need not be identical to that of the left side. Typically, though, the selected handlebar configuration will be symmetrical, thus only one side of the inventive apparatus need be provided with appropriate scales.

The scale readings recorded by the salesman are forwarded to the manufacturer for use in custom preparation of the actual motorcycle handlebar. Typically, the manufacturer will use a handlebar bending jig calibrated with scales corresponding to those on the inventive selection apparatus. By thus bending the handlebar, the resultant product will exactly conform to the configuration selected by the customer. In this regard, note that stops 38 provided on planar members 31 (see FIGURES 3 and 5) limit the allowable pivotal orientation of handles 23 so as to prevent customer selection of an angle which cannot actually be fabricated.

Thus, it may be seen that the inventive apparatus permits complete selection of handlebar shape on an individual basis. The invention permits easy recordation of the selected configuration in a manner readily utilizable by the manufacturer to produce the desired custom handlebar. Note that by consecutively numbering the values on the various scales, the changes for error in recordation or production of the handlebar is minimized by elimination of repetitive scale numbers, thereby substantially reducing the likelihood of erroneously producing a handlebar of other than the desired shape.

What is claimed is:

1. Apparatus for individual pre-manufacture selection of a handlebar for motorcycles and the like, said apparatus comprising:
   a generally U-shaped tubular central member having at least one end portion, said end portion comprising a spring biased ball extending radially therefrom;
   a cylindrical extension member adapted for telescopic reception of said end portion, said extension member being selectively rotationally and longitudinally positionable with respect to said end portion, said extension member defining a plurality of longitudinally spaced transverse slots adapted to partially receive said ball, said ball engaging said extension member at a selectable one of said slots for resiliently detaining longitudinal movement of said extension member while permitting rotational movement thereof corresponding to the slot length;
   a handle; and
   pivot means pivotally connecting said handle to said extension member for selective angular orientation therebetween.

2. Apparatus as defined in claim 1 further comprising first scale means for indicating the relative rotational position of said extension member and said end portion.

3. Apparatus as defined in claim 2 further comprising second scale means for indicating the relative longitudinal position of said extension member and said end portion.

4. Apparatus as defined in claim 3 further comprising third scale means for indicating the relative angular position of said handle and said extension member.

5. Apparatus for individual pre-manufacture selection of a handlebar for motorcycles and the like, said apparatus comprising:
   a generally U-shaped tubular central member having at least one end portion;
   a cylindrical extension member adapted for telescopic reception of said end portion, said extension member being selectively rotationally and longitudinally positionable with respect to said end portion;
   a rod-shaped handle; and
   pivot means pivotally connecting said handle to said extension member for selective angular orientation therebetween, said pivot means comprising first and second rigid planar portions extending respectively from one end of said handle and a closed end of said extension member.

6. Apparatus as defined in claim 5 wherein said planar portions are disposed in parallel adjacent relationship, and said pivot means comprises a bolt extending perpendicular through said planar portions and a self-tightening nut fastening said bolt.

7. Apparatus as defined in claim 6 comprising a scale on one of said planar portions and a reference marker on the other of said planar portions for indicating the relative angular orientation of said handle and said extension member.

8. Apparatus for individual pre-manufacture selection of a handlebar for motorcycles and the like, said apparatus comprising:
- a generally U-shaped central member having a symmetrical pair of end portions;
- a pair of cylindrical extension members adapted for telescopic reception of respective ones of said end portions, each of said extension members being selectively rotationally and longitudinally positionable relative to its respective said end portion;
- a pair of handles, each of said handles being pivotally connected to a respective one of said extension members for selective angular orientation therebetween;
- means for maintaining each of said extension members at a selectable one of a plurality of locations longitudinal of its respective said end portion; and
- a plurality of scale means for indicating respectively the selected rotational and longitudinal positions of each of said extension members relative to their respective said end portions, and the selected angular orientation of said pivotally connected handles relative to their respective said extension members.

References Cited
UNITED STATES PATENTS

| | | | |
|---|---|---|---|
| 578,180 | 3/1897 | Wood | 74—551.4 |
| 659,123 | 10/1900 | Bies | 74—551.4 |
| 661,563 | 11/1900 | Stockford | 74—551.4 |
| 691,830 | 1/1902 | Whitely et al. | 74—551.4 |

FOREIGN PATENTS

| | | |
|---|---|---|
| 50,059 | 3/1935 | Denmark. |
| 614,303 | 12/1926 | France. |

FRED C. MATTERN, JR., Primary Examiner

F. D. SHOEMAKER, Assistant Examiner